United States Patent
Moraes

(10) Patent No.: US 7,249,461 B2
(45) Date of Patent: Jul. 31, 2007

(54) TURBINE FUEL RING ASSEMBLY

(75) Inventor: Ricardo Ferreira Moraes, Orlando, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 643 days.

(21) Appl. No.: 10/646,876

(22) Filed: Aug. 22, 2003

(65) Prior Publication Data

US 2005/0039457 A1    Feb. 24, 2005

(51) Int. Cl.
*F02C 7/20* (2006.01)
*F23D 11/36* (2006.01)

(52) U.S. Cl. .......................... 60/796; 60/800; 60/739; 431/343

(58) Field of Classification Search .................. 60/796, 60/800, 799, 739; 431/354, 343, 345, 27, 431/284, 285
See application file for complete search history.

(56) References Cited

U.S. PATENT DOCUMENTS

| | | | |
|---|---|---|---|
| 3,236,048 A * | 2/1966 | Spears, Jr. .................... | 60/739 |
| 4,170,111 A | 10/1979 | Lewis et al. | |
| 4,455,840 A | 6/1984 | Matt et al. | |
| 4,499,735 A | 2/1985 | Moore et al. | |
| 5,771,696 A * | 6/1998 | Hansel et al. .................. | 60/739 |
| 5,937,653 A | 8/1999 | Alary et al. | |
| 5,983,642 A | 11/1999 | Parker et al. | |
| 6,109,038 A * | 8/2000 | Sharifi et al. .................. | 60/737 |
| 6,282,904 B1 | 9/2001 | Kraft et al. | |
| 6,446,439 B1 | 9/2002 | Kraft et al. | |
| 6,487,860 B2 * | 12/2002 | Mayersky et al. ............ | 60/739 |
| 2002/0174657 A1 | 11/2002 | Rice et al. | |

FOREIGN PATENT DOCUMENTS

EP    0 620 402 A1    10/1994

\* cited by examiner

*Primary Examiner*—Charles G. Freay

(57) ABSTRACT

A turbine fuel ring assembly includes a fuel distribution ring, at least one fuel supply tube attached to the fuel distribution ring and at least one attachment leg connected to the fuel distribution ring. The fuel ring has a hollow interior and a plurality of apertures for expelling a fluid. The attachment leg is configured to allow flexibility due to thermal expansion induced under certain load conditions such as during engine start-up or shut-down. Further, the configuration of the attachment legs provides improved stress distribution characteristics. The fuel supply tube includes a rectangular passage and a round passage that are disposed substantially transverse to each other and in fluid communication with each other and with the hollow interior of the fuel distribution ring. The rectangular passage and the round passage have substantially identical cross-sectional areas. The fuel supply tube is configured to avoid structural interferences with neighboring components.

18 Claims, 7 Drawing Sheets

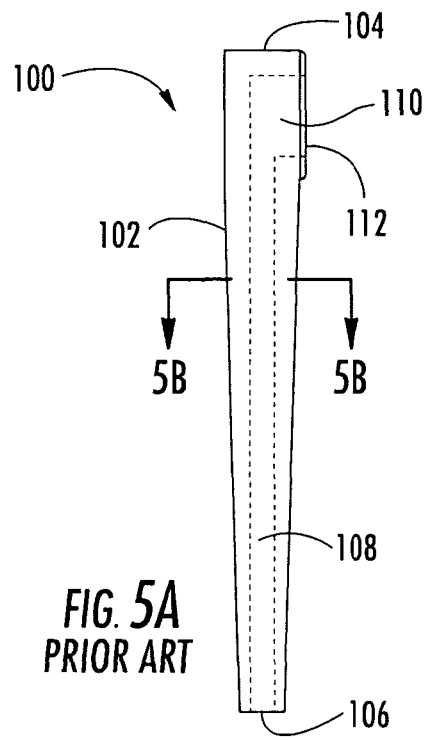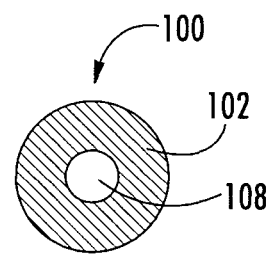
FIG. 5A
PRIOR ART
FIG. 5B
PRIOR ART
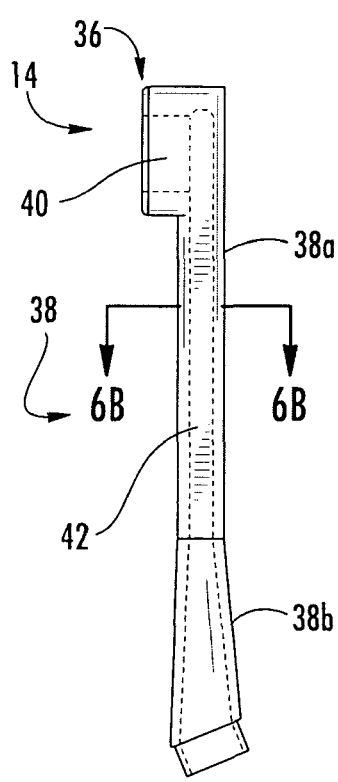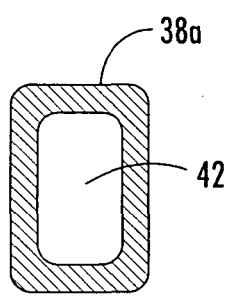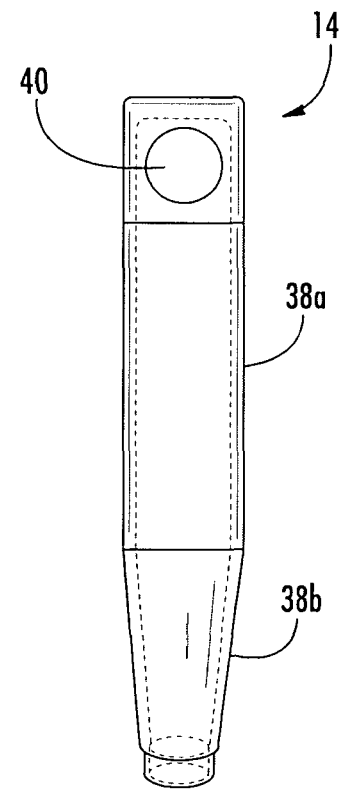
FIG. 6A
FIG. 6B
FIG. 6C

TURBINE FUEL RING ASSEMBLY

FIELD OF THE INVENTION

The invention relates in general to turbine engines and, more particularly, to a turbine fuel ring assembly configured to avoid structural interferences with neighboring components and to provide enhanced stress distribution characteristics.

BACKGROUND OF THE INVENTION

Environmental regulations may limit the amount of NOx emitted from turbine engines. One known manner for reducing NOx emissions is to mix the compressed air used for combustion with fuel before the air enters the primary combustion zone. Such premixed air burns cleaner than combustion air that is not premixed so as to reduce the amount of NOx generated. In addition to the NOx reduction benefit, premixed combustion air can assist in the management of the dynamic forces during combustion. In particular, when the primary combustion zone is provided with a air/fuel premixture, a more stable, controlled and predictable combustion occurs. As a result, the potential for high frequency acoustic combustion forces and their associated dangers are minimized.

A fuel injector assembly can be provided for distributing fuel into the compressed air flow upstream of the main combustor portion of the turbine. In one prior design, fuel is injected into the compressed air stream using a ring-type assembly 90 as shown in FIG. 2A. The prior fuel ring assembly 90 includes a fuel ring 95, a fuel supply tube 100 and five attachment legs 150.

The configuration of the prior fuel supply tube 100 is shown in FIGS. 5A and 5B. The prior fuel supply tube 100 comprises an elongated body 102 having first and second ends 104, 106. The elongated body 102 has a generally tapering cylindrical outer profile. Extending longitudinally through a portion of the elongated body 102 is a circular passage 108 through which fuel can flow. The circular passage 108 begins at the second end 106 of the supply tube 100 but does not extend through to the first end 104. The first end 104 of the supply tube 100 includes a circular passage 110 that extends from a connection interface surface 112 and partially into the first end 104 and substantially transverse to the circular passageway 108 of the elongated body 102 such that the circular passages 102, 110 are in fluid communication. Though the exterior of the supply tube 100 is tapered, the circular passage 108 maintains a substantially constant diameter through the elongated body portion 102.

The connection interface 112 of the tube 100 can connect into a fuel supply source or conduit (not shown); the second end 106 of the tube 100 can be connected to the fuel ring 95. The fuel ring 95 (see FIG. 2A) includes a hollow interior such that the passages 108,110 in the supply tube 100 fluidly communicate with the hollow interior of the fuel ring 95. In particular, the supply tube 100 is connected into the fuel ring 95 so that it extends substantially perpendicular from the fuel ring 95. Further, the supply tube 100 is connected to the fuel ring 95 such that the center line of the passage 108 in the elongated body 102 is in line with the hollow interior of the fuel ring 95. In other words, the center line of the elongated body 102 of the supply tube 100 is not offset from the hollow interior of the fuel ring 95.

In addition to the details of the prior supply tube 100, the configuration of the prior attachment legs 150, as shown in FIGS. 3A and 3B, deserves mention. The prior attachment legs 150 include a first end 152, a second end 154 and a substantially planar bridge portion 156 connecting the first and second ends 152,154. The first end 152 includes a portion 158 that protrudes transversely outward from the bridge portion 156. The first end 152 further includes a passage 160 for receiving a bolt. The second end 154 includes a c-shaped portion 162 that protrudes transversely outward from the bridge portion 156 of the attachment leg 150. Further, the c-shaped portion 162 extends in the opposite direction of the protruding portion 158 of the first end 152.

While the above-described prior fuel ring configuration has proved successful in combination with certain turbine engine designs, it has been difficult to integrate it into more recent turbine engine designs because of structural interferences with nearby components. However, it is still desirable to retain the fuel ring due to the various benefits of premixed combustion air as discussed above.

Thus, one object according to aspects of the present invention is to provide a new configuration for a turbine fuel ring assembly that avoids interferences with adjacent turbine engine structure. Another object according to aspects of the present invention is to provide an improved attachment leg for the fuel ring assembly that not only avoids interferences but also provides enhanced stress distribution characteristics. Yet another object according to aspects of the present invention is to provide a fuel supply tube that uses differing flow passage conformations to allow the exterior of the tube to avoid interferences while maintaining relatively constant flow area. Still other aspects according to the present invention relate to retrofitting prior engines with the present fuel ring assembly without extensive rework or retrofit operations. These and other objects according to aspects of the present invention are addressed below.

SUMMARY OF THE INVENTION

Aspects of the present invention are directed to an attachment leg for a turbine fuel ring. The attachment leg includes a substantially flat first leg portion, a substantially flat second leg portion and a transition portion between the first and second leg portions offsetting the first leg portion from the second leg portion. The attachment leg can be a single-piece construction.

The substantially flat first leg portion terminates at a first end. The first leg portion further includes an opening for receiving a turbine component fastener. The substantially flat second leg portion terminates at a second end configured for connection to a turbine engine fuel ring. At least a portion of the second end can be generally c-shaped and extend substantially transversely from the second leg portion. The first and second leg portions are substantially parallel, and the first portion can be at least twice as thick as the second portion.

The transition portion between the first and second leg portions is located closer to the first end of the attachment leg such that the second leg portion is longer than the first leg portion. The transition portion can have at least one curve. In some cases, the first and second leg portions can be offset such that the first leg portion is not co-planar with any portion of the second leg portion.

The attachment leg can also include a countersunk washer and a bolt. The countersunk washer can have an inner side and an outer side; the bolt can have a first end including a head portion and second end including a shank portion. Further, the attachment leg can include inward and outward faces. The outer side of the washer can be positioned substantially adjacent to the inward face of the first leg portion so that the shank portion of the bolt can pass through the washer and the opening in the first leg portion. In such case, the first end of the bolt and the inner side of the washer can be substantially aligned with the inward face of the second leg portion.

Other aspects of the present invention relate to a fluid supply tube for a turbine fuel ring. The fluid supply tube according to aspects of the invention can be a single piece construction or it can be a two-piece construction.

The fluid supply tube includes a head portion and a duct portion substantially transversely extending from the head portion. The head portion has a generally round fluid inlet passage extending at least partially therethrough. The duct portion includes a elongated body portion and an outlet end portion. The duct portion further has a substantially rectangular passage extending longitudinally therethrough. The rectangular passage of the duct portion and the round passage of the head portion has substantially identical cross-sectional areas and are disposed substantially transverse to each other and in fluid communication.

With respect to the duct portion of the supply tube, the outlet end portion can angle away from the elongated body portion. For example, the outlet end portion can angle from about 20 degrees to about 25 degrees away from the elongated body. Further, the outlet end can be adapted for connection to a fuel distribution component and the head portion can be adapted for connection to a fuel supply.

Still other aspects of the present invention are directed to a fuel distribution assembly. The fuel distribution assembly includes a fuel distribution ring, at least one fluid supply tube attached to the fuel distribution ring, and one or more attachment legs connected to the fuel distribution ring. The at least one fluid supply tube and the one or more leg components can extend substantially transversely from the fuel distribution ring. The fuel distribution assembly can include five attachment legs and one fluid supply tube.

The fluid supply tube includes a head portion and a duct portion substantially transversely extending from the head portion. The head portion has a round fluid inlet passage extending at least partially therethrough, and the duct portion includes an elongated body portion and an outlet end portion angling away from the elongated body portion. The duct portion has a substantially rectangular passage extending longitudinally therethrough. The rectangular passage of the duct portion and the round passage of the head portion have substantially identical cross-sectional areas. Further, the rectangular and round passages are disposed substantially transverse to with each other and are in fluid communication with each other as well as with the hollow interior of the fuel distribution ring. The axis of the elongated body portion of the duct portion of the fuel supply tube can be offset radially outwardly of the hollow interior of the fuel distribution ring.

The attachment leg includes a substantially flat first leg portion, a substantially flat second leg portion, and a transition portion between the first and second leg portions offsetting the first leg portion from the second leg portion. The first leg portion terminates at a first end and includes an opening for receiving a turbine component fastener. The second leg portion terminates at a second end configured for connection to a turbine engine fuel ring. At least a portion of the second end is generally c-shaped and extends substantially transversely from the second leg portion. The first and second leg portions are substantially parallel.

The transition portion between the first and second leg portions offsets the first leg portion from the second leg portion. The transition portion is located closer to the first end of the attachment leg such that the second leg portion is longer than the first leg portion.

The fuel distribution ring has a hollow interior and a plurality of apertures for expelling a fluid. The fuel distribution ring can also include a t-connector for connecting the outlet end portion of the fuel supply tube to the fuel distribution ring.

Further, the fuel distribution assembly can include at least one connector that circumferentially surrounds a portion of the fuel distribution ring. The connectors can provide a surface to which the c-shaped end of the attachment legs are secured.

BRIEF DESCRIPTION OF THE DRAWINGS

FIG. 2A is an isometric view of a fuel ring assembly according to aspects of the present invention.

FIG. 5A is a side elevational view of a prior art fuel supply tube.

FIG. 5B is a cross-sectional view of a prior art fuel supply tube, taken along line 5B—5B of FIG. 5A.

FIG. 6A is a side elevational view of fuel supply tube according to aspects of the present invention.

FIG. 6B is a cross sectional view of a fuel supply tube according to aspects of the present invention, taken along line 6B—6B of FIG. 6A.

FIG. 6C is a front elevational view of a fuel supply tube according to aspects of the present invention.

DETAILED DESCRIPTION OF EMBODIMENTS OF THE INVENTION

Aspects of the present invention improve upon the prior fuel ring configuration. Aspects of the present invention relate to a fuel ring assembly that can avoid interferences problems with surrounding components. Other aspects of the present invention are directed to novel geometries for the attachment legs and the fluid supply tube that facilitate installation and/or provide improved stress distribution characteristics.

Embodiments of the invention will be explained in the context of a turbine fuel ring assembly, but the detailed description is intended only as exemplary. Embodiments of the invention are shown in FIGS. 1, 2B, 4 and 6–8, but the present invention is not limited to the illustrated structure or application.

Figure 2A:
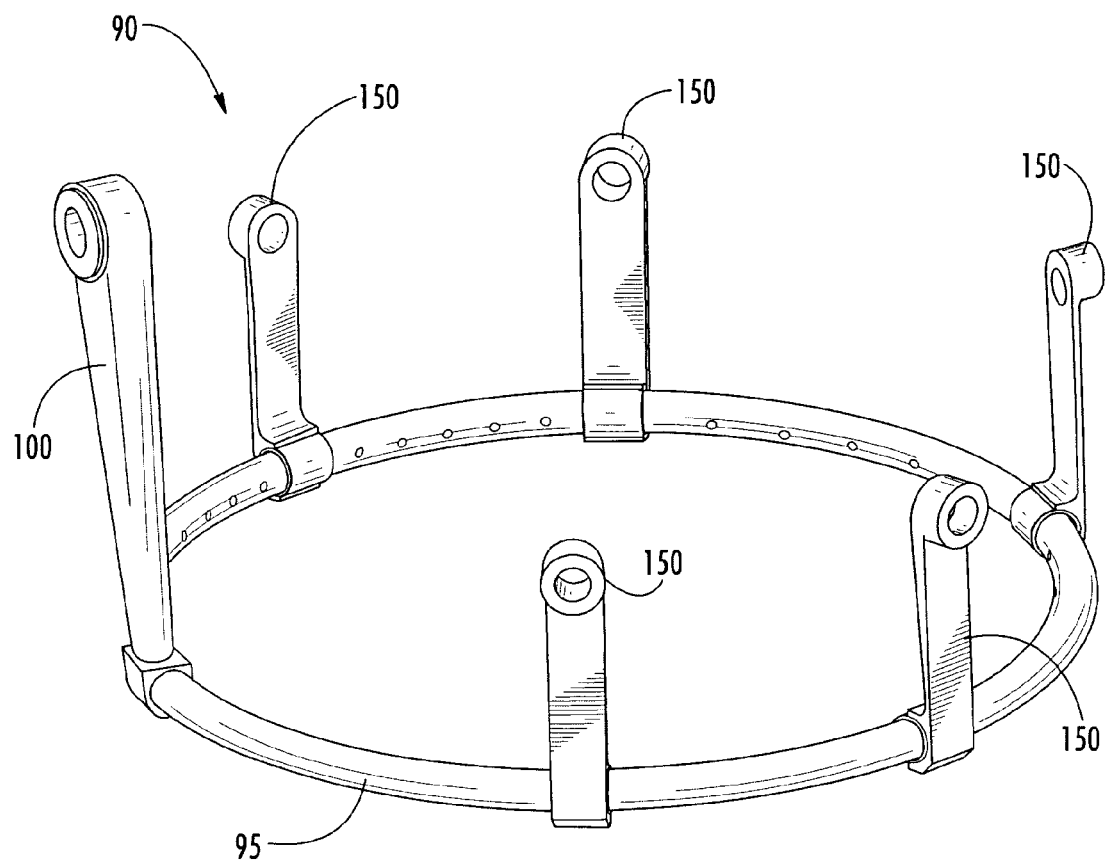
FIG. 2A is an isometric view of a prior art fuel ring assembly.
Figure 2B:
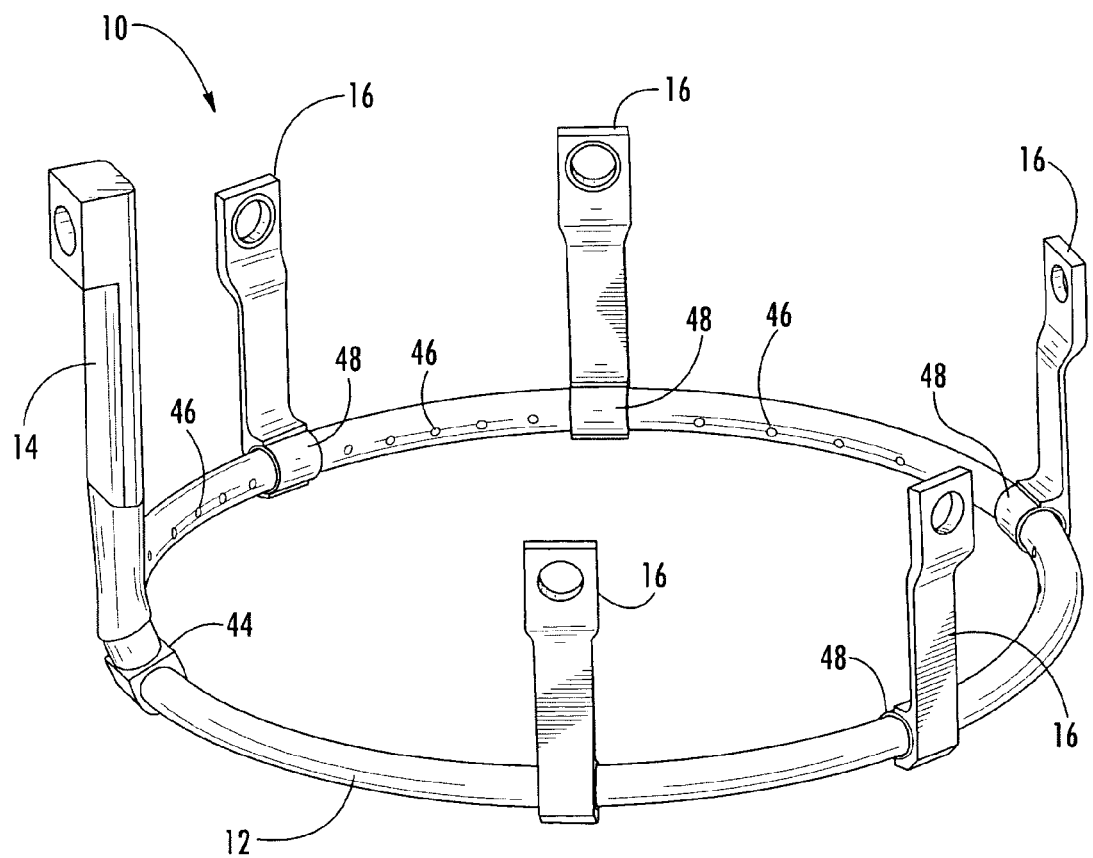

As shown in FIG. 2B, aspects of the present invention relate to a turbine fuel ring assembly 10. The assembly generally comprises a fuel ring 12, one or more fluid supply tubes 14 and one or more attachment legs 16. Each of these components will be discussed below.

Figure 4A:
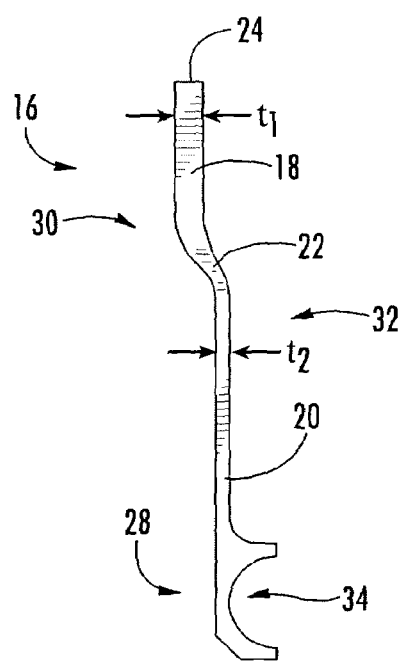
FIG. 4A is a side elevational view of a fuel ring attachment leg according to aspects of the present invention.
Figure 4B:
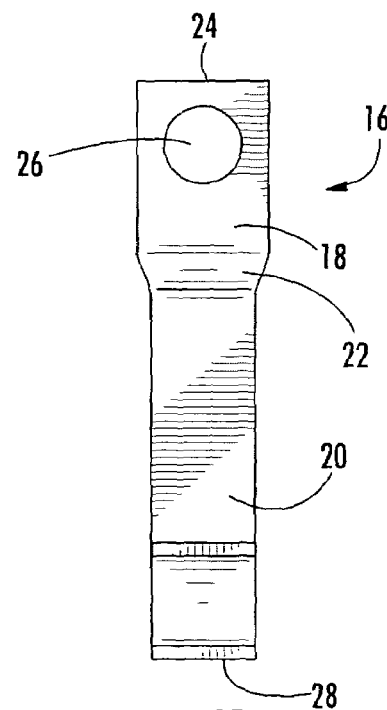
FIG. 4B is a front elevational view of a fuel ring attachment leg according to aspects of the present invention.

Aspects of the present invention relate to improved attachment legs 16 for the turbine fuel ring assembly 10. As shown in FIGS. 4A and 4B, the attachment leg 16 can include a first leg portion 18, a second leg portion 20 and a transition portion 22 between the first and second leg portions 18, 20 offsetting the first leg portion 18 from the second leg portion 20.

The first leg portion 18 can be substantially flat and can terminate at a first end 24. The first leg portion 18 can provide one or more openings 26 for receiving a turbine component fastener such as, for example, a bolt. Likewise, the second leg portion 20 can be substantially flat and terminate at a second end 28. The first and second portions 18,20 each have respective first and second thicknesses t1, t2. The first and second thickness t1,t2 can be a variety of thicknesses and need not be equal. In one embodiment, the thickness t1 of the first portion 18 is at least twice as thick as the thickness t2 of the second portion 20. Further, the attachment leg can include an outward face 30 and an inward face 32. The relative terms "inward" and "outward" here are used to facilitate discussion by reflecting the general direction that each side will face when installed. However, the invention is not limited to positioning the attachment legs in such inward and outward positions.

Figure 3A:
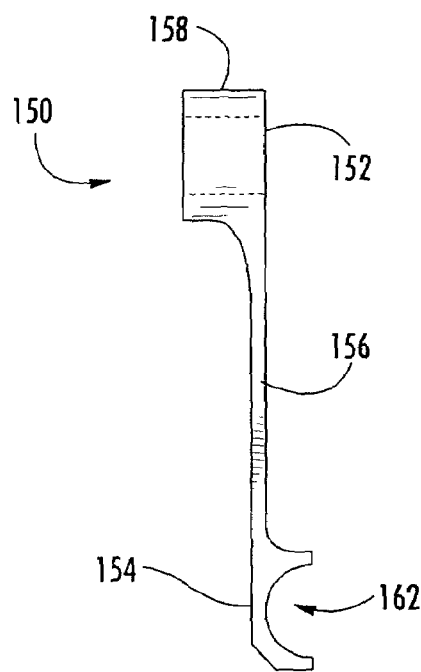
FIG. 3A is a side elevational view of a prior art fuel ring attachment leg.
Figure 3B:
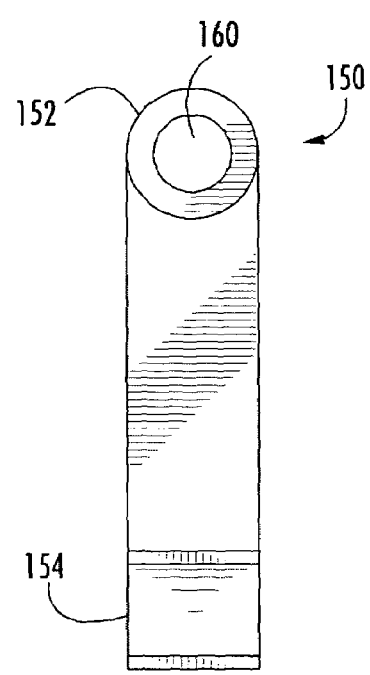
FIG. 3B is a front elevational view of a prior art fuel ring attachment leg.

The second end 28 can be configured for connection to the fuel ring 12. For example, at least a portion of the second end 28 can be c-shaped 34 and extend substantially transversely from the second leg portion 20. The c-shaped portion 34 can be adapted for matingly receiving a portion of the fuel ring 12. The c-shaped portion 34 can be substantially identical to the c-shaped portion 162 of the prior attachment leg 150 design (FIGS. 3A–B). Furthermore, the overall width of the attachment leg 16 can be substantially identical to the width of the prior attachment leg 150 design (FIGS. 3A–3B).

As noted above, the first and second leg portions 18, 20 are offset from one another by a transition portion 22. "Offset" means that at least a portion of the first leg portion 18 is not substantially co-planar with at least a portion of the second leg portion 20. There may be some portions of the first and second leg portions 18,20 that are co-planar, but the thickness t1 of the first portion 18 cannot exist entirely in the same plane as the thickness t2 of the second portion 20. Similarly, the thickness t2 of the second portion 18 cannot exist entirely in the same plane as the thickness t1 of the first portion 20. In one embodiment, the first leg portion 18 is not co-planar with any portion of the thickness t2 of the second leg portion 20. Regardless of whether the first and second leg portions 18,20 are co-planar, it is preferred if the first and second leg portions 18, 20 are substantially parallel to each other.

The transition 22 can be positioned anywhere between the first and second end portions 18,20. Preferably, the transition 22 is located closer to the first end 18 of the attachment leg 16 such that the second leg portion 20 is longer than the first leg portion 18. The transition portion 22 can have any of a number of forms. For example, the transition portion 22 can comprise one or more curves, bends or straight pieces, or any combination thereof.

The attachment leg 16 can be a single-piece construction or it can be made of two or more components. In one embodiment, the attachment leg 16 can be a cast component and in another embodiment, the attachment legs 16 can be formed at least in part by one or more machining operations. Alternatively, the attachment leg 16 can comprise multiple components joined together by, for example, welding. The attachment leg 16 can be made of a variety of materials including Inconel 625 and 304 stainless steel.

Stress analysis models have revealed that the attachment leg 16 according to aspects of the present invention provide improved stress distribution characteristics over the prior attachment leg design (FIGS. 3A–3B), especially in the area of the transition portion 22 of the attachment leg 16.

The fuel ring assembly 10 can further comprise a fluid supply tube 14. The supply tube 14 can include a head portion 36 and a duct portion 38 substantially transversely extending from the head portion 36. The head portion 36 being generally cylindrical and the duct portion 38 being substantially rectangular in conformation. The duct portion 38 can include an elongated body portion 38a and an outlet end portion 38b. The outlet end portion 38b can angle away from the elongated body 38a. In one embodiment, the outlet end portion 38b angles from about 20 degrees to about 25 degrees away from the elongated body 38a; in another embodiment the outlet end portion 38b extends away at an angle of about 22.5 degrees. The angle at which the outlet end portion 38b extends can be dictated by surrounding components. In one embodiment, the outlet end portion 38b is formed so as to maintain a certain clearance between the supply tube 14 and the surrounding components, such as a liner.

The head portion 36 of the supply tube 14 can have a fluid inlet passage 40 extending at least partially therethrough. Examples of possible conformations for the inlet passage 40 include circular, oblong and oval. The duct portion 38 of the supply tube 14 can have a substantially rectangular passage 42 extending longitudinally therethrough. The rectangular passage 42 in the outlet end portion 38b can extend away from the rectangular passage 42 in the elongated body portion 38a at substantially at the same angle at which the outlet end portion 38b extends away from the elongated body portion 38a. The rectangular passage 42 of the duct portion 38 and the round passage 40 of the head portion 36 preferably have substantially identical cross-sectional areas. The rectangular passage 42 in the duct portion 38 and round passage 40 in the head portion 36 meet so as to be in fluid communication with each other. Further, the rectangular 42 and round 40 passages are disposed substantially transverse to each other.

The outlet end 38b can be adapted for connection to a fuel distribution component such as a fuel ring 12, and the head portion 36 can be adapted for connection to a fuel supply (not shown). For example, the outlet end 38b and the head portion 36 can include internal or external threads or there may be additional associated hardware to complete the connection. Alternatively, the outlet end 38b and the head portion 36 can be configured to receive other components.

The supply tube 14 can be made in a variety of manners. For example, the supply tube can be a cast part such as one made by investment casting. Alternatively, the supply tube 14 can be machined. In such case, the resulting feed tube 14 is a single-piece construction. However, the supply tube 14 can be made from more than one piece. For example, the supply tube 14 can comprise two pieces that are joined by forging and/or welding. The supply tube 14 can be any of a variety of materials and in one embodiment the supply tube 14 is made of Inconel 625.

The fuel ring 12 itself can have numerous configurations. For example, the fuel ring 12 can be a single part made by, for example, casting and/or machining processes. Alternatively, the fuel ring 12 can be formed by a plurality of segments joined together. The fuel ring 12 can also be made of various materials and, preferably, it is made of Inconel 625. The fuel ring 12 can include one or more fasteners and/or fittings to facilitate attachment to other components. For example, the fuel ring 12 can include a t-fitting 44 so as to connect into the fuel supply tube 14. The t-fitting 44 can be oriented so as to be aligned with outlet end portion 38b of the supply tube 14.

Regardless of the construction, the fuel ring 12 can include a hollow interior for receiving fuel. Naturally, the fuel ring 12 can contain one or more apertures 46 for discharging fuel out of the ring 12 and into the compressed air stream so as to create a premixed air. In one embodiment, the fuel ring comprises 32 apertures 46. The apertures 46 can have any conformation such as circular and be spaced in any manner such as equidistant or otherwise. Preferably, the apertures 46 are positioned so that fuel will be sprayed toward the axial centerline of the fuel ring 12.

Having described the individual components according to aspects of the present invention, one illustrative manner in which these components can be assembled will now be described. The following description is merely an example of a sequence in which the individual steps can occur. The described steps can be performed in almost any order and not every step described must occur.

First, the fuel ring 12 is assembled. In one embodiment, the fuel ring 12 can comprise six hollow arcuate segments that are joined to form the ring 12. A t-fitting 44 can be disposed between two of the segments so as to provide a connection point for the supply tube 14. The segments and t-fitting can be joined in any of a variety of manners such as by welding, brazing, coupling, fitting, adhesives, threaded engagement or interference fit.

Next, the attachment legs 16 can be connected to the fuel ring. However, if the fuel ring 12 is relatively thin-walled, the attachment legs 16 cannot be attached directly to the fuel ring 12 by certain processes such as by welding. Therefore, connectors 48 are used to provide a thicker surface that is suitable for welding. However, if the fuel ring 12 has a sufficiently large wall thickness then the connectors 48 may not even be needed, and the attachment legs 16 can be directly welded to the fuel ring 12. In one embodiment, the connectors 48 can also be used as coupling to join multiple ring segments together.

The connectors 48 can have a number of shapes and, in one embodiment, the connectors 48 are generally c-shaped and are placed at least partially around the circumference of the fuel ring 12 at various points. Preferably, the connectors 48 along with the t-fitting 44 are equally spaced about the circumference of the fuel ring. The connectors 48 and/or t-fitting 44 can then be secured to the fuel ring such as by tack welding.

Next, the attachment legs 16 can be attached to the fuel ring 12. In one embodiment, the c-shaped portion 34 of the second end 28 of the attachment legs 16 are positioned so as to matingly receive at least a portion of a respective connector 48 secured to the fuel ring 12. Further, the attachment legs 16 can be positioned such that each leg 16 extends substantially transversely from the fuel ring 12. Once in position, the attachment legs 16 can be tack welded to the connectors 48 to generally hold the attachment legs 16 in place. In another operation, the legs 16 can be welded to the connector 48 completely around the interface between the c-shaped portion 30 of the attachment leg 16 and the connector 48.

After the attachment legs 16 are secured in place, the supply tube 14 can be attached to the fuel ring 12. Preferably, the outlet end portion 38b of the supply tube 14 is connected to the t-fitting 44 so that the supply tube 14 is in fluid communication with the hollow interior of the fuel ring 12. Further the supply tube 14 can be connected to the t-fitting 44 so as to extend substantially transversely from the fuel ring 12. In one embodiment, it is preferred if the axis of the rectangular passage 42 in the elongated body portion of the duct portion 38 of the fuel supply tube 14 is offset radially outwardly from the hollow interior of the fuel distribution ring 12. "Offset radially outwardly" means that the axis of the rectangular passage 42 would not cross into the hollow interior of the fuel ring, and it can mean that axis of the rectangular passage 42 would slightly extend into the hollow interior of the fuel ring 12 but not so far so as to intersect the hoop-shaped axis extending about the hollow interior of the fuel ring 12. The attachment of the supply tube 14 to the fuel ring 12 can be in any of a variety of methods. In one embodiment, the feed tube is first tack welded to the t-fitting 44 and then is fully welded about its outlet end 38b to the t-fitting 44. Other manners of attachment are possible such as by threaded engagement.

Figure 1:
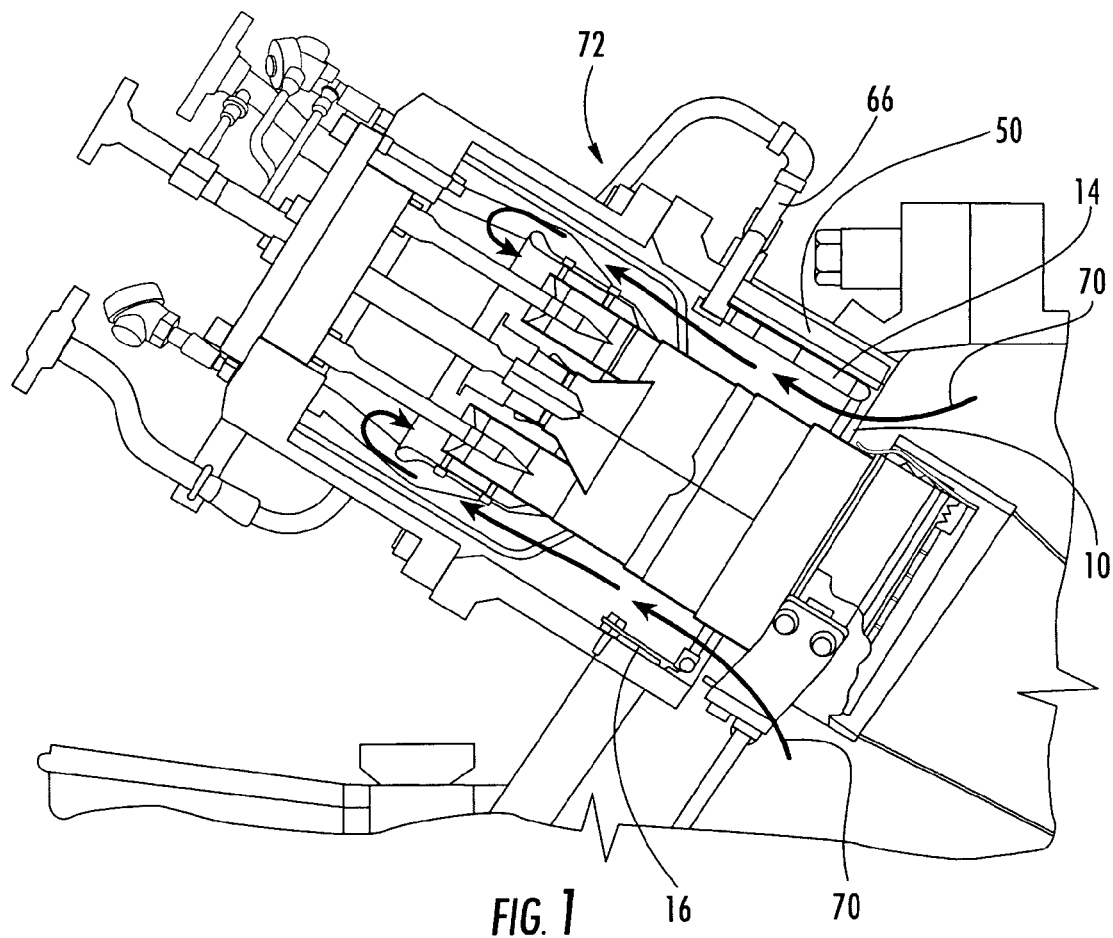
FIG. 1 is a cross-sectional view of the combustor section of a turbine engine according to aspects of the present invention.
Figure 7:
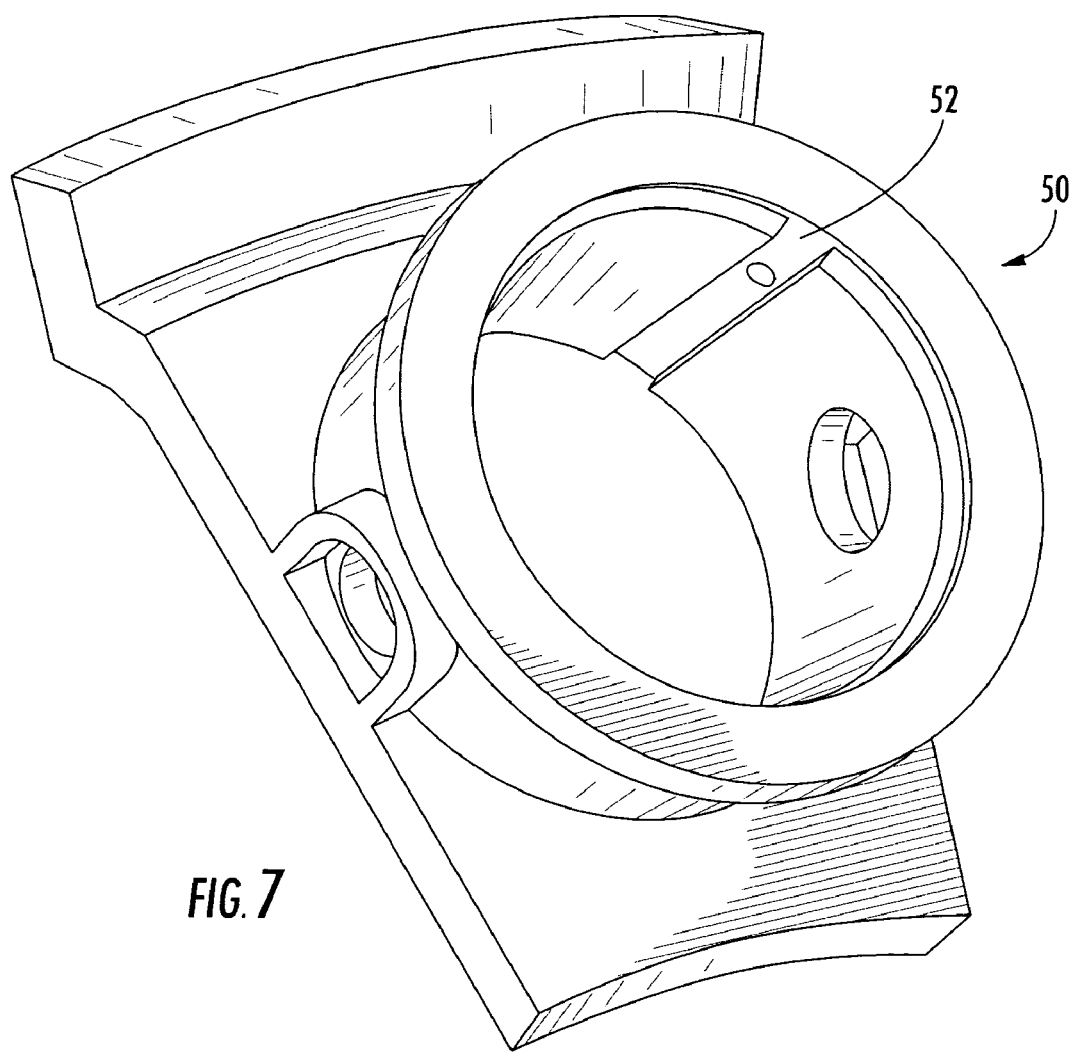
FIG. 7 is an isometric view of a turbine portal including a groove according to aspects of the present invention.
Figure 8:
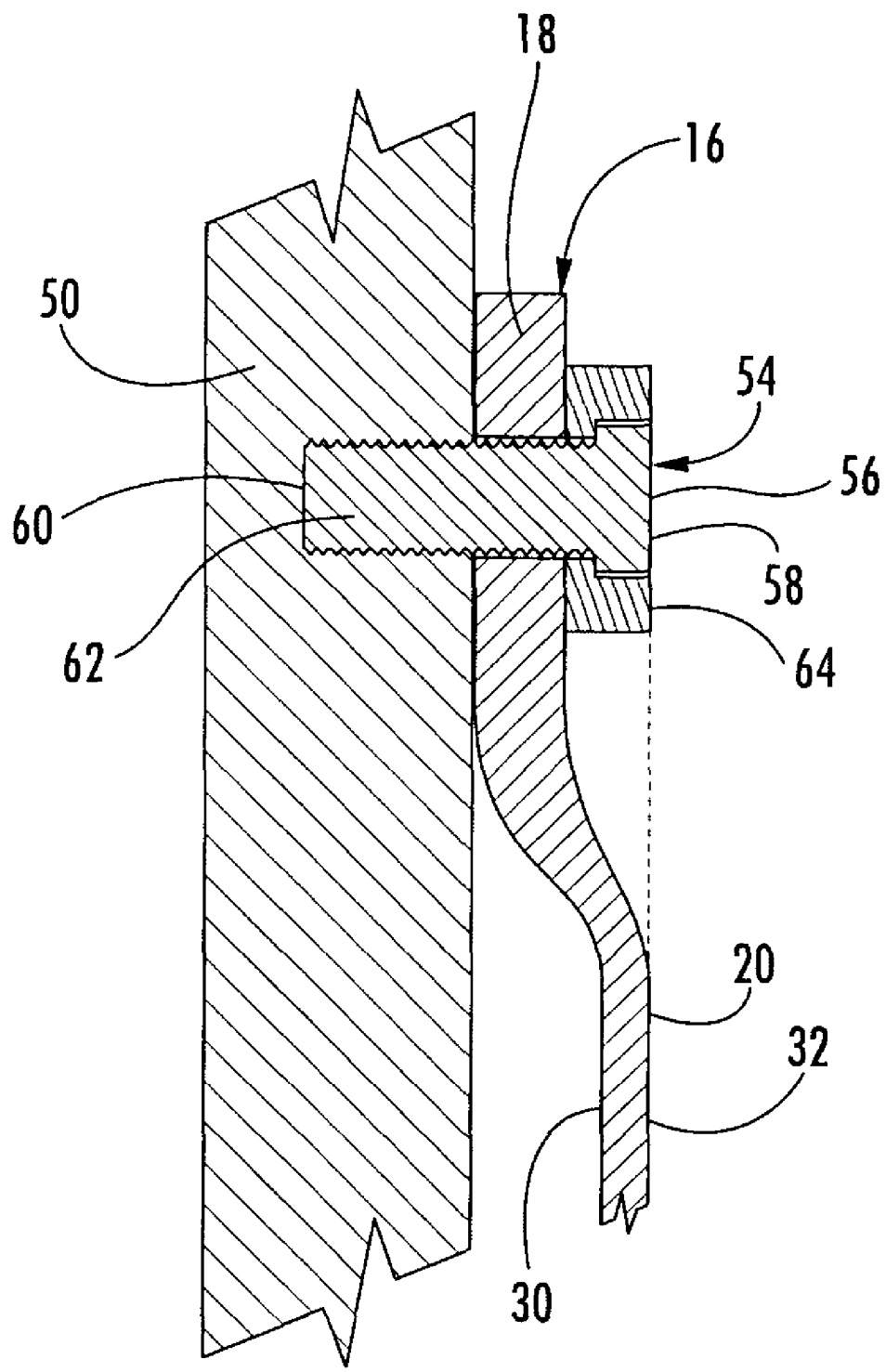
FIG. 8 is a cross-sectional view of an attachment leg secured to the side of the portal.

The assembled fuel ring 10 can then be installed in the turbine engine by, for example, attaching the fuel ring 10 to a neighboring structure such as a portal 50 (see FIG. 1). If necessary, the portal 50 can include one or more features for accommodating all or a portion of the fuel ring assembly 10. For example, as shown in FIG. 7, the portal 50 can include a groove or channel 52 for avoiding interferences with, for example, the fuel supply tube 14. Such features can be machined or cast into the portal 50.

In one embodiment, the attachment legs 16 are secured to the portal 50 using bolts. To that end, the portal 50 can include one or more openings for receiving a fastener such as a bolt 54. Preferably, the same mounting pattern used on the prior fuel ring assembly 90 can be used in connection with the fuel ring assembly 10 according to aspects of the present invention.

The bolts 54 used to secured the fuel ring assembly 10 to the portal 50 can be any type of bolt. For example, the bolt 54 can have a first end 56 including a head portion 58 and second end 60 including a shank portion 62. As noted earlier, the attachment leg can include inward face 32 and outward face 30. The shank portion 62 of the bolt 54 can pass through the opening 26 in the first leg portion 18 such that the first end 56 of the bolt 54 is substantially flush with the inward face 32 of the second leg portion 20. In another embodiment, the attachment can further include a washer 64, such as a countersunk washer, that can be positioned substantially adjacent to the inward face 32 of the first leg portion 18 such that the opening in the washer is in substantial alignment with the opening 26 in the first leg portion 18 of attachment leg 16. In such case, the first end 56 of the bolt 54 and the top of the washer 64 can be substantially flush with the inward face 32 of the second leg portion 20.

After mounting to the portal, a fuel supply line 66 (FIG. 1) can be connected to the head portion 36 of the supply tube 14 so as to be in fluid communication with round passage 40 in the feed tube 14. The attachment of the fuel supply line 66 to the supply tube 14 can be accomplished in any of a number of manners. For example, the round passage 40 in the supply tube has threads, such as NPT-F threads, for threadably engaging corresponding threads on the fuel supply line 66.

Having described various individual components and a manner in which these components can be arranged to form a turbine fuel ring assembly 10 in accordance with aspects of the present invention, an example of the operation of such a fuel ring assembly 10 will be described below.

Fuel is supplied to the hollow interior of the fuel ring 12 through feed tube 14. The fuel is discharged from the ring 12 through a series of apertures 46. As shown in FIG. 1, compressed air 70 from the compressor portion of the turbine (not shown) can enter the combustor section 72 of the turbine through portal 50. As the air passes the fuel ring assembly 10, fuel is sprayed into the air stream. The premixed air then proceeds and, as shown, ultimately makes a 180 degree turn and enters the primary combustion zone through a pilot cone or one of the surrounding air swirlers. Again, because the air is premixed with fuel, the combustion process will yield lower NOx emissions and provide more predictable combustion dynamics.

While the general operation of a fuel ring has been described, a fuel ring according to aspects of the present invention is subjected to a variety of loads during operation. There are three main loads experienced by the fuel ring assembly 10. As will be described below, the fuel ring assembly 10 according to aspects of the present invention is configured to provide enough flexibility so as to effectively distribute the stresses imparted by these loads.

One load condition occurs during engine start-up. In such case, compressed air enters the combustor portion of the turbine engine, as described above, at a heightened temperature such as about 440 degrees Fahrenheit. The fuel ring assembly 10 and surrounding components, however, are at room temperature. Due to the exposure to the compressed air, the fuel ring 10 heats up quickly because it is relatively thin-walled and hollow. However, the neighboring components such as the portal 50 does not heat up as fast because it is a relatively thick metal component. Thus, the fuel ring 10 will experience thermal expansion at a greater rate than the portal 50. Ultimately, at least a portion of the fuel ring 10 can come into contact with the portal 50; consequently, the fuel ring 10 may break due to the contact.

However, the offset portion 22 of the attachment legs 16 positions the fuel ring assembly 10 away from the portal 50 so as to provide more space for the fuel ring assembly 10 to expand; thus, the chances that the fuel ring assembly 10 will come into contact with the portal 50 are reduced. Moreover, the transition portion 22 of the attachment legs 16 provides the attachment legs 16 with enough flexibility so as to distribute the thermally induced stresses.

Another load occurs during engine shut-down. In such case, the portal 50 as well as the fuel ring assembly 10 are hot from continued operation. After shut-down, the fuel ring assembly 10 cools relatively quickly because it is a thin-walled and hollow component. In contrast, the portal 50 cools relatively slowly because of its greater thickness. Thus, the fuel ring assembly 10 attempts to shrink at a faster rate than the portal 50. Again, the attachment legs 16 provide the radial flexibility needed to accommodate these differing cooling rates without subjecting the attachment legs 16 to excessive stresses.

Another load occurs when the engine has reached a certain point such as 50% of its base load and then cold fuel is supplied to the fuel ring assembly 10. At that point the fuel ring assembly 10 is heated. The cold fuel causes the interior of the fuel ring 10 to shrink whereas the compressed air causes the exterior of the fuel ring 10 to expand. These counteracting forces subject the fuel ring assembly 10 to stress. Thus, the attachment legs 16 allow enough flexibility for expansion or shrinkage of the fuel ring 10.

It will of course be understood that the invention is not limited to the specific details described herein, which are given by way of example only, and that various modifications and alterations are possible within the scope of the invention as defined in the following claims.

What is claimed is:

1. An attachment leg for a turbine fuel ring, comprising:
    a substantially flat first leg portion terminating at a first end, wherein the first leg portion includes an opening for receiving a turbine component fastener;
    a substantially flat second leg portion terminating at a second end configured for connection to a turbine engine fuel ring, wherein the first and second leg portions are substantially parallel; and
    a transition portion between the first and second leg portions offsetting the first leg portion from the second leg portion, the transition portion being located closer to the first end of the attachment leg such that the second leg portion is longer than the first leg portion, wherein at least a portion of the second end is generally c-shaped and extends substantially transversely from the second leg portion.

2. The attachment leg of claim 1, wherein the first leg portion is not co-planar with any portion of the second leg portion.

3. The attachment leg of claim 1, further comprising:
    a countersunk washer having an inner side and an outer side; and
    a bolt having a first end including a head portion and second end including a shank portion,
    wherein the attachment leg includes inward and outward faces, wherein the outer side of the washer is positioned substantially adjacent to the inward face of the first leg portion, wherein the shank portion of the bolt passes through the washer and the opening in the first leg portion such that the first end of the bolt and the inner side of the washer are substantially flush with the inward face of the second leg portion.

4. The attachment leg of claim 1, wherein the attachment leg is single-piece construction.

5. The attachment leg of claim 1, wherein the first portion is at least twice as thick as the second portion.

6. The attachment leg of claim 1, wherein the transition portion comprises at least one curve.

7. A fluid supply tube for a turbine fuel ring comprising:
    a head portion having a generally round fluid inlet passage extending at least partially therethrough; and
    a duct portion substantially transversely extending from the head portion, the duct portion including a elongated body and an outlet end portion, the duct portion having a substantially rectangular passage extending longitudinally therethrough, the rectangular passage of the duct portion and the round passage of the head portion having substantially identical cross-sectional areas,
    wherein the rectangular and round passages are disposed substantially transverse to each other and in fluid communication.

8. The fluid supply tube of claim 7 wherein the outlet end portion angles away from the elongated body.

9. The fluid supply tube of claim 8 wherein the outlet end portion angles from about 20 degrees to about 25 degrees away from the elongated body.

10. The fluid supply tube of claim 7 wherein the fluid supply tube is a single piece construction.

11. The fluid supply tube of claim 7 wherein the fluid supply tube is a two-piece construction.

12. The fluid supply tube of claim 7 wherein the outlet end portion is adapted for connection to a fuel distribution component and the head portion is adapted for connection to a fuel supply.

13. A fuel distribution assembly comprising:

a fuel distribution ring having a hollow interior and a plurality of apertures for expelling a fluid;

at least one fluid supply tube attached to the fuel distribution ring, the fluid supply tube including a head portion and a duct portion substantially transversely extending from the bead portion, the head portion having a round fluid inlet passage extending at least partially therethrough, the duct portion including a elongated body and an outlet end portion angling away from the elongated body, the duct portion having a substantially rectangular passage extending longitudinally therethrough, the rectangular passage of the duct portion and the round passage of the head portion having substantially identical cross-sectional areas, wherein the rectangular and round passages are disposed substantially transverse to each other and in fluid communication with each other and with the hollow interior of the fuel distribution ring;

one or more attachment legs connected to the fuel distribution ring, each attachment leg including: (a) a substantially flat first leg portion terminating at a first end and including an opening for receiving a turbine component fastener; (b) a substantially flat second leg portion terminating at a second end configured for connection to the fuel distribution ring, wherein the first and second leg portions are substantially parallel, at least a portion of the second end is generally c-shaped and extends substantially transversely from the second leg portion; and (c) a transition portion between the first and second leg portions offsetting the first leg portion from the second leg portion, the transition portion being located closer to the first end of the attachment leg such that the second leg portion is longer than the first leg portion.

14. The fuel distribution, assembly of claim 13 wherein the assembly includes five attachment legs and one fluid supply tube.

15. The fuel distribution assembly of claim 13 wherein the at least one fluid supply tube and the one or more attachment legs extend substantially transversely from the fuel distribution ring.

16. The fuel distribution assembly of claim 13 wherein the axis of the elongated body of the duct portion of the fuel supply tube is offset radially outwardly of the hollow interior of the fuel distribution ring.

17. The fuel distribution assembly of claim 13 further comprising:

at least one connector circumferentially surrounding a portion of the fuel distribution ring, wherein the connectors provide a surface to which the c-shaped end of the attachment legs are secured.

18. The fuel distribution assembly of claim 13 wherein the fuel distribution ring further includes a t-connector for connecting the outlet end portion of the fuel supply tube to the fuel distribution ring.

* * * * *